US007637046B2

(12) United States Patent
Dicke et al.

(10) Patent No.: US 7,637,046 B2
(45) Date of Patent: Dec. 29, 2009

(54) SIGN PANEL ATTACHMENT

(75) Inventors: Grant D. Dicke, Downers Grove, IL (US); Jeffrey A. Williams, Downers Grove, IL (US)

(73) Assignee: Dicke Tool Company, Downers Grove, IL (US)

(*) Notice: Subject to any disclaimer, the term of this patent is extended or adjusted under 35 U.S.C. 154(b) by 328 days.

(21) Appl. No.: 11/710,385

(22) Filed: Feb. 23, 2007

(65) Prior Publication Data

US 2008/0202006 A1 Aug. 28, 2008

(51) Int. Cl.
*G06F 17/00* (2006.01)

(52) U.S. Cl. .......................................... 40/603; 40/612

(58) Field of Classification Search .................. 40/603, 40/611.01, 611.02, 610, 612; 248/223.41, 248/224.51

See application file for complete search history.

(56) References Cited

U.S. PATENT DOCUMENTS

| | | | | |
|---|---|---|---|---|
| 2,484,096 | A * | 10/1949 | Kay | 244/153 R |
| 4,426,800 | A | 1/1984 | Brown | |
| 4,507,887 | A | 4/1985 | Seely | |
| 4,535,825 | A | 8/1985 | Hackney | |
| 4,592,158 | A | 6/1986 | Seely | |
| 4,888,894 | A | 12/1989 | Brown, Jr. | |
| 5,152,091 | A | 10/1992 | Leach | |
| 5,446,984 | A | 9/1995 | Kulp et al. | |
| 5,472,162 | A | 12/1995 | Mason | |
| 6,003,827 | A | 12/1999 | Kulp et al. | |
| 6,290,193 | B1 * | 9/2001 | Williams et al. | 248/200 |
| 6,381,889 | B1 * | 5/2002 | Knapp | 40/612 |
| 6,463,687 | B1 | 10/2002 | Dorstewitz | |
| 6,622,409 | B2 | 9/2003 | Dorstewitz | |

* cited by examiner

*Primary Examiner*—Lesley D Morris
*Assistant Examiner*—Kristina Staley
(74) *Attorney, Agent, or Firm*—Olson & Cepuritis, Ltd.

(57) ABSTRACT

A mounting system is provided for flexible message panel assemblies. An end cap is secured to the panel assembly with an elastic flexible tether which allows the end cap to be fitted over an end of a rib supporting the panel. Stored force in the elastic tether holds the corner of the message panel in position.

8 Claims, 13 Drawing Sheets

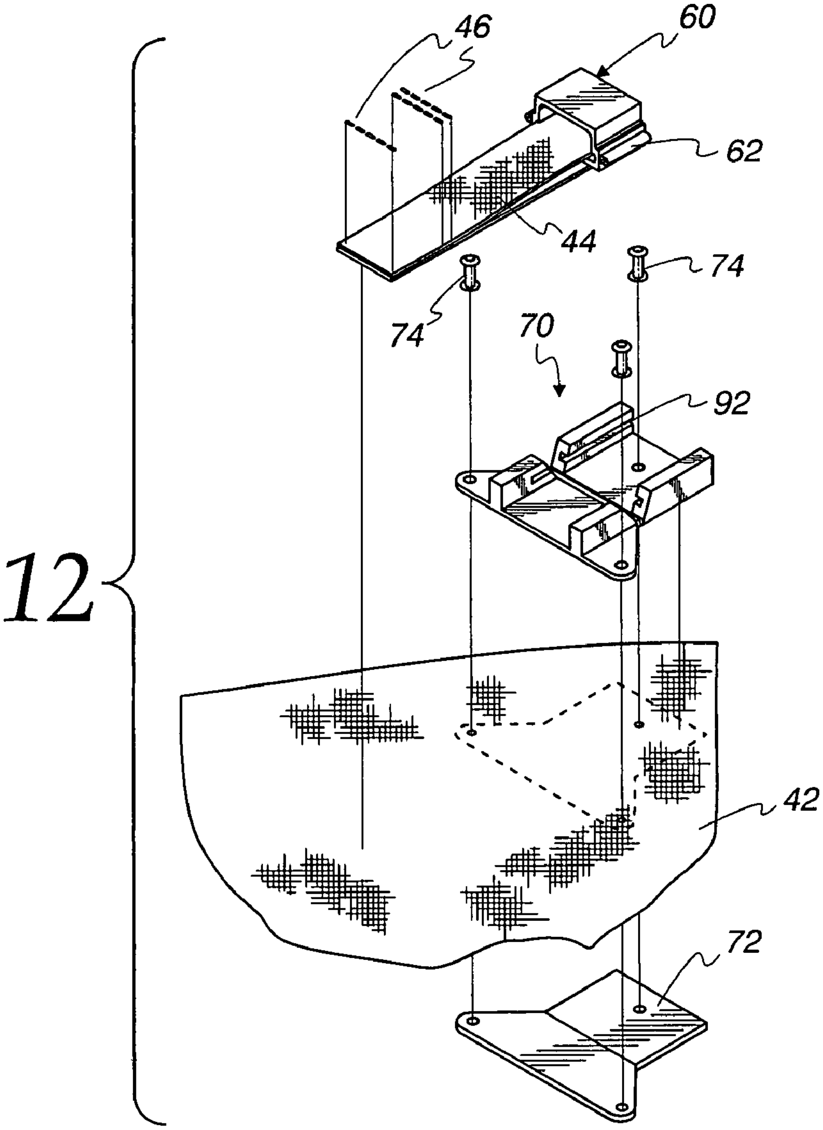
Fig. 12
Fig. 13
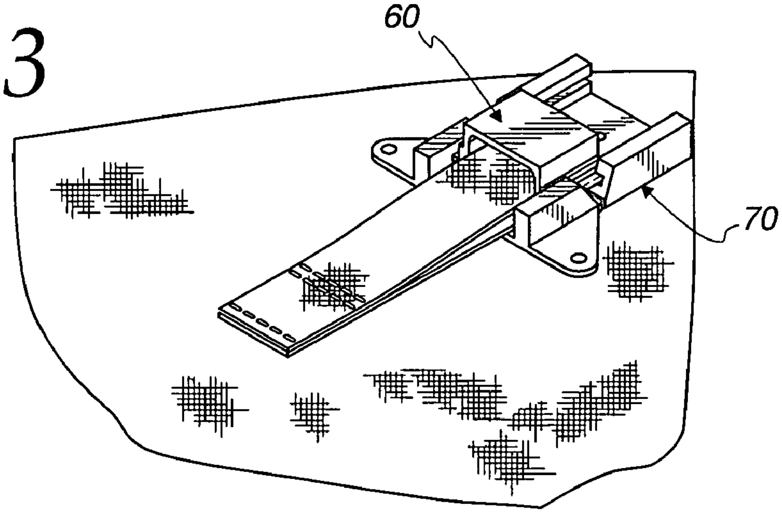

SIGN PANEL ATTACHMENT

FIELD OF THE INVENTION

The present invention relates to attachments for sign panels and in particular to sign panels made of flexible material which, for example, can be rolled up for storage when not in use.

BACKGROUND OF THE INVENTION

Signs providing warnings and other information are often employed in close proximity to vehicular traffic as well as pedestrians traveling alongside roadways, or on sidewalks. A typical use for such sign panels is to convey a message giving warning or other notice of a nearby traffic obstruction such as a work site. Such message panels must be of a substantial size in order to attract the attention of motorists and pedestrians engaged in what is oftentimes a repetitive course of activity. When signs, particularly relatively large sign panels made of flexible material are placed near a roadside, localized wind gusts from passing vehicles can add substantial impact to naturally occurring wind forces. Accordingly, considerable attention has been paid to stabilize large sign panels, whether made of rigid or flexible material, since the "sail area" of the message panel can capture a substantial force applied by wind loading.

One notable trend in recent years is the increased use of sign panels and other warning devices which are capable of being folded into a compact package so as to be conveniently stored in the trunk of a passenger vehicle. Such packages are also made to fit in a relatively small space, such as an elongated pocket on a work vehicle reserved for stowing temporary signs along side other equipment. Warning devices of these types are typically employed only for brief periods of time and the occasion of their deployment oftentimes cannot be predicted in advance. For example, work crews assigned to work on a portion of roadway or a roadside location must be free to carry out their assignments without undue intrusion from nearby passing vehicles and pedestrians. Accordingly, it is important that suitably impactful messaging be provided to alert motorists and pedestrians to avoid work site areas.

In addition to the relatively large physical size of the message panels deployed, it is important that the orientation of the message panels be optimized with regard to the direction of traffic flow. Accordingly, it is important that the angular orientation of the face of the message panel to the direction of traffic flow be maintained in a constant direction despite wind gusts and other loads applied to the message panel. A message panel of flexible material is usually deployed by being suspended on an open framework. Typically, the framework comprises a scissors or central pivoting connection of a pair of battens, frame members or ribs made of relatively lightweight and somewhat flexible material such as aluminum or a fiberglass. The ribs may be deployed so as to overlie one another, forming a collapsed structure having an elongated shape of minimal cross-sectional size. Typically, the flexible message panel is then rolled around the collapsed ribs, for storage in a long tube or other suitable space provided for the purpose. Deployment proceeds with an initial unrolling of the message panel fabric to expose the ribs, which are then pivoted in a mutually orthogonal position. Typically, one rib arranged in a vertical direction and the other rib arranged in a horizontal direction. The flexible message panel, which is typically of a square configuration, has its corners attached to the end points of the expanded ribs. Because of the relatively delicate nature of the message panel material compared to the applied loadings and the relatively small cross-sectional size of each rib, special precautions have been taken for mounting the corners of message panels to rib ends.

One popular arrangement for securing the corners of message panels is found in U.S. Pat. Nos. 5,446,984; 6,003,827; 4,888,894 and 4,426,800. In these patents, a rigid pocket-like structure, made of plastic or other suitable material is attached to the corners of the message panel. The pocket defines a channel suitable for receiving a rib end. Thus, wind loadings other forces and abrasion from repeated assembly and disassembly is taken up by the plastic pocket structure. It is noted that similar problems arising in different technological areas have provided imaginative solutions. For example, U.S. Pat. No. 4,535,825 discloses an improvement in sail battens, where a pocket sewn in a canvas sail dimensioned to receive the end of a batten, is provided with reinforcements which are held against the end of the batten by the use of a cord secured to a point on the batten, inboard of its free end. U.S. Pat. No. 6,381,889 discloses a cover portion for engaging a batten, which in turn is supported by tracks with which it is engaged.

Flexible straps of toughened material have been employed to secure the corners of message panels with respect to the end portions of supporting battens or ribs. For example, U.S. Pat. No. 4,507,887 employs flexible straps secured to the corners of a message panel which, after being wrapped around the end of a batten, are secured to inboard portions of the batten by snap fasteners. U.S. Pat. No. 4,592,158 further adds the use of hook and loop fastener material to secure the message panel to the battens.

One particular arrangement for securing a flexible message panel to a pair of supporting ribs is described in U.S. Pat. No. 5,152,091. Highway signs constructed generally according to this patent were offered for sale by Pacific Safety Corporation of Salem, Oreg. In this sign arrangement, message panels were provided with flexible straps at their corners for securement to the ends of supporting ribs. Buckle-shaped fasteners are secured at one end of the straps and are provided with an internal opening to permit passage of a rib, therethrough. When deploying a sign panel, the buckle-shaped fasteners are inserted over the free ends of the ribs, and released. In order to maintain the desired tension for the message panel, unwanted inward travel of the buckle-shaped fasteners is prevented by stops or protrusions mounted to the ends of the ribs. The protrusions engage the buckle-shaped fasteners, preventing their further inward travel along the rib. This business concern is now owned and operated by the assignee of the present invention.

With reference to FIGS. 17-19, examination of one type of sign system unit offered for sale by Pacific Safety Corporation revealed that opposed, panel-mounted horizontal straps, while having a somewhat elastic underlying component, were prohibited from stretching because of their incorporation with overlying strap members of woven, inelastic non-extendable material. Essentially, the strap fasteners applied to the message panels operate in a conventional, substantially non-stretchable manner. Referring to FIGS. 17-19 a corner of a prior art sign assembly is shown. In FIG. 17, a corner of a sign panel 2 is provided with an aluminum buckle 5, secured to the sign panel with flexible, elastic layer 6 overlaid by a flexible, but substantially inelastic layer 3. The layers or straps 3, 6 are secured to flexible panel 2 by stitching 4. The longitudinal cross sectional view of FIG. 19 shows the arrangement of FIG. 17 fitted over the free end 8 of a conventional fiberglass rib. A rubber stop 9 is secured to the rib with a rivet fastener, and prevents buckle 5 from further inward travel along the rib (in a rightward direction as shown in FIG. 19). It will be appreciated upon a careful study of FIGS. 17 and 19, that the elastic layer 6 is, at most, allowed to stretch only very limited amounts, if at all. It is believed that, at one time, there may have been a desire to "take up slack" in a sign panel fitted in the cold morning hours, and thereafter heated as the daily temperature increases. There is no confirmation of this, however, and in any event, an elastic contraction to overcome daily thermal stretching would be very small, on the order of a small fraction of an inch (e.g. one-sixteenth to one-eighth of an inch). From examining the panel illustrated in FIGS. 17-19, it was not apparent that even this small amount of stretching was possible.

As indicated in FIG. 18, the straps 3, 6 share the opening of buckle 5 with the fiberglass rib, and with wear, tend to intrude into the space intended for the rib making the assembly of FIG. 19 difficult.

Several sign panel systems are described as employing stretchable straps to secure the corners of message panels to extended ribs. For example, U.S. Pat. Nos. 6,463,687 and 6,622,409 employ shock cords at the left and right corners of the sign panel to define limits for the swiveling of the sign. The shock cords are secured to eyelets which in turn engage S-shaped hooks. The shock cords are provided with strap ends which, when pulled, fix the length of the shock cord to apply a force to the sign panel. Plastic pockets are provided to engage the ends of the supporting rods. Further, U.S. Pat. No. 5,472,162 employs a stretchable elastomeric strap which is wrapped over a molded plastic cap, fitted to the ends of cross-brace members, supporting the message panel.

Despite these advances, further improvements in sign systems have been sought. For example, improvements to lower manufacturing costs while providing improved wear resistance and compact storage are still needed.

SUMMARY OF THE INVENTION

The present invention provides a novel and improved sign system that minimizes the disadvantages associated with prior art sign systems and provides advantages in construction, mode of operation and use. One embodiment of a sign system includes a mount system for mounting a flexible message panel to a supporting rib. The mount system comprising an end cap defining a first passageway for receiving an end of the supporting rib and a flexible, resiliently extendable tether having one end secured to the end cap and the other end for securement to the flexible message panel. In one example, the end cap defines a second passageway for receiving the one end of the tether, the first and the second passageways separated from one another by a separator such as a stepped sidewall.

In another embodiment, a mount is provided with an attachment for securement to the panel and a slidable interengagement is provided for the slidably interengaging the mount with the end cap as the end cap receives the supporting rib. In one example, the slidable interengagement comprises a projection carried on one of the end cap and the mount and a recess for receiving the projection defined by the other of the end cap and the mount. The slidable interengagement may comprise a sliding rib carried on the end cap and a recess defined by the mount for slidably receiving the sliding rib.

In a further embodiment, the mount comprises first and second hingedly connected mount portions and the end cap is positioned so that it bridges both mount portions, preventing their relative hinging movement.

BRIEF DESCRIPTION OF THE DRAWINGS

In the drawings:

FIG. 12 is an exploded perspective view of the arrangement of FIG. 10 being fitted to a flexible panel;

FIG. 13 is a perspective view of a completed fastener system;

DETAILED DESCRIPTION OF PREFERRED EMBODIMENTS

Figure 1:
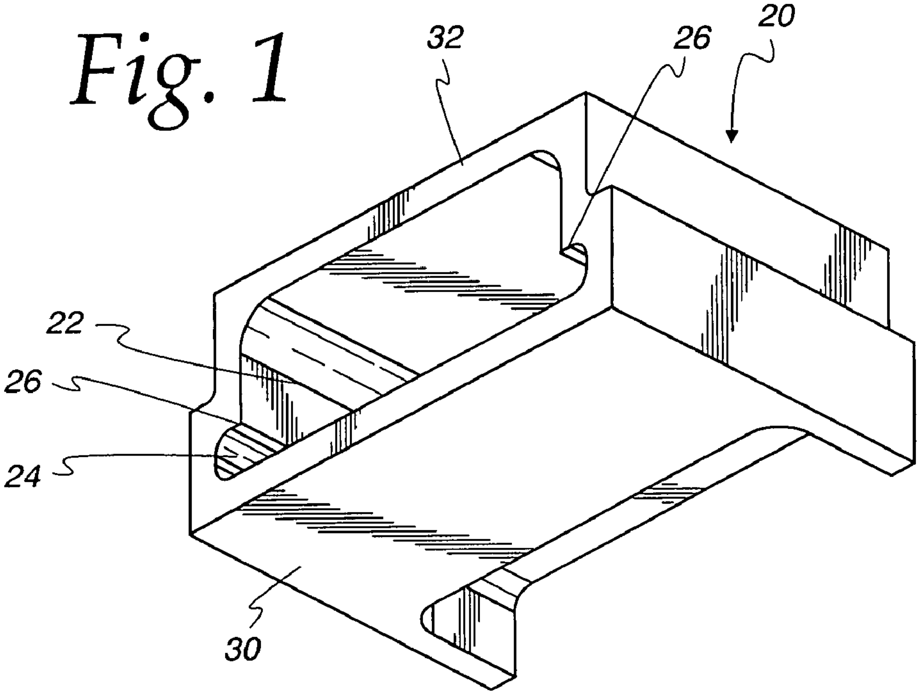
FIG. 1 shows a perspective view of an end cap according to principles of the present invention.

The invention disclosed herein is, of course, susceptible of embodiment in many different forms. Shown in the drawings and described herein below in detail are the preferred embodiments of the invention. It is to be understood however, that the present disclosure is an exemplification of the principles of the invention and does not limit the invention to the illustrated embodiments.

For ease of description, sign systems embodying the present invention are described herein below and their usual assembled position as shown in the accompanying drawings, and terms such as front, rear, upper, lower, horizontal, longitudinal, etc. may be used herein with reference to this usual position. However, the sign systems may be manufactured, transported, sold or used in orientations other then that described and shown herein.

Referring now to FIGS. 1-9, a first embodiment of a sign system according to principles of the present invention will be described. With initial reference to FIGS. 1-6, the sign system includes an end cap generally indicated at 20. End cap 20 may be formed of virtually any material desired, but is preferably made of molded plastic construction and certain design details have been included that optimize manufacturing advantages of the end cap using cost effective molding techniques. For example, as will be appreciated by those skilled in the art, end cap 20 can be made with a relatively simple and inexpensive two-part mold without requiring side actions requiring additional expense.

End cap 20 is secured to one or more corners of a message panel, and an elastic, flexible tether is stretched to allow the end cap to be fitted over a free end of a fiberglass rib or similar panel support. As can be seen for example in FIG. 2, end cap 20 defines a pair of passageways 22, 24 separated by an internal divider 26. A bottom wall 30 is preferably foreshortened, as can be seen for example in FIGS. 1 and 5 so as to be substantially shorter than the opposed top wall 32. As can be seen for example in the rear elevational view of FIG. 3, an end wall 34 closes off the upper cavity 22, acting as a convenient stop to prevent further travel of end cap 20, once the end cap is fitted over the end of a support rib, such as support rib 38, in the manner illustrated in FIGS. 7-9. If desired, optional thickening elements such as teeth 35 can be added to back wall 34.

Figure 2:
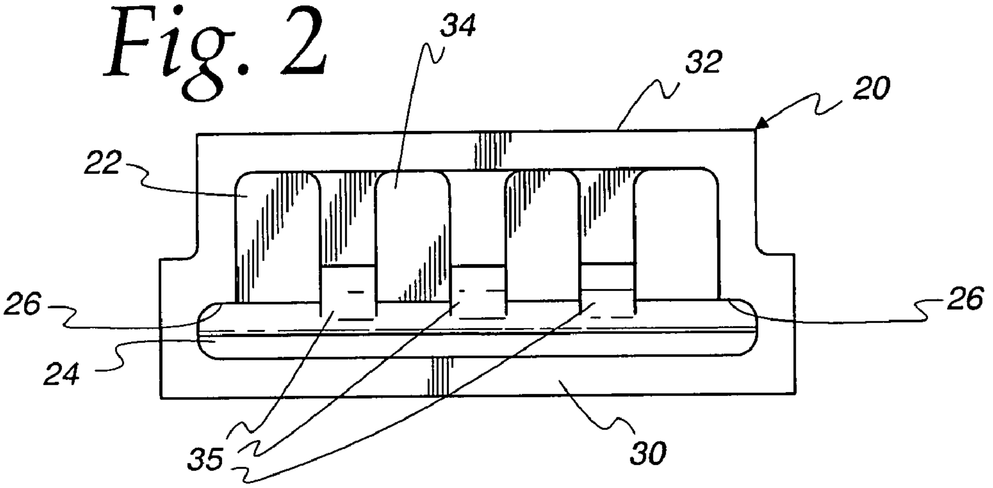
FIG. 2 is a front elevational view thereof.
Figure 3:
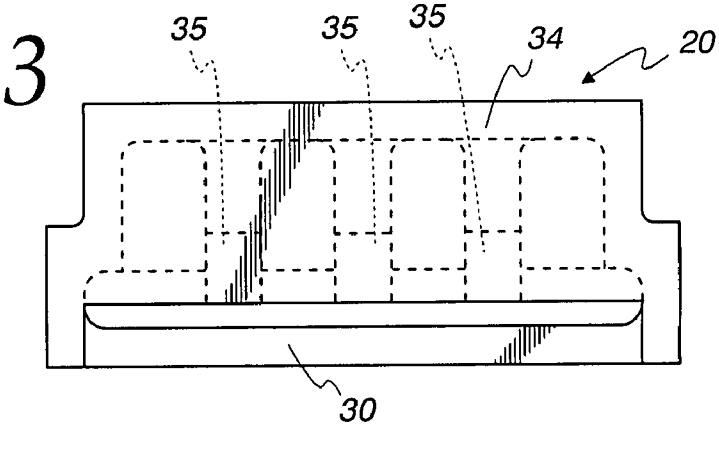
FIG. 3 is a rear elevational view thereof.
Figure 4:
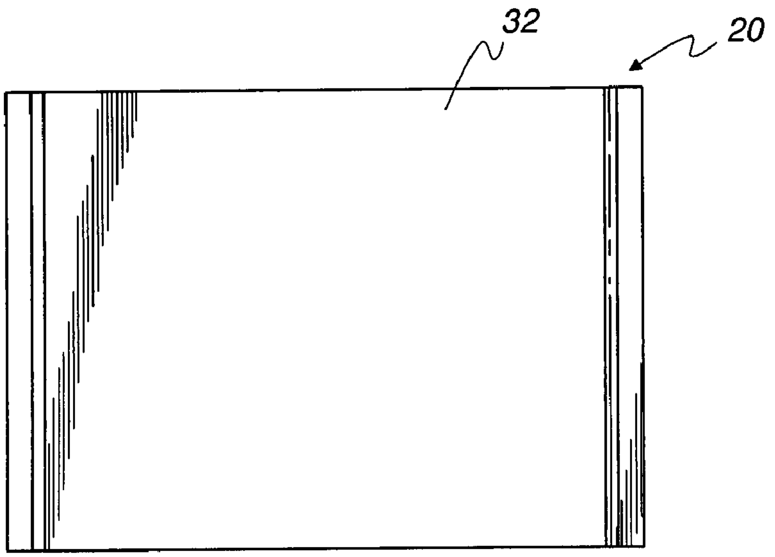
FIG. 4 is a top plan view thereof.
Figure 5:
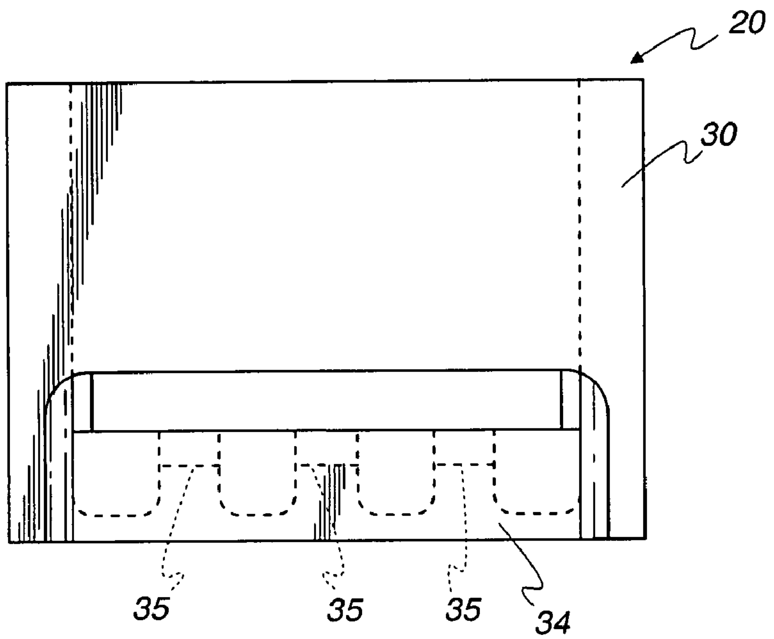
FIG. 5 is a bottom plan view thereof.
Figure 6:
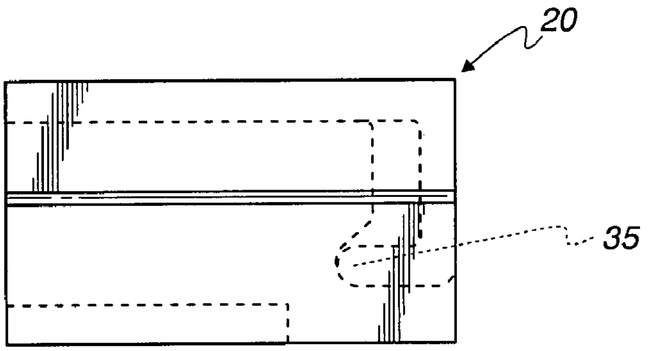
FIG. 6 is a side elevational view thereof, taken from one side, with the other side view being identical.

As can be seen for example in FIGS. 1 and 2, the outer lateral surface of end cap 20 is stepped so as to follow the relative dimensions of internal passageways 22, 24. As can be seen in FIG. 1, the stepped inter bore of end cap 20 conveniently provides stepped divider portions 26 of each side of the end cap, eliminating the need for a continuous divider wall although a continuous divider wall could be provided, if desired. In the first embodiment illustrated in FIGS. 1-9, the stepped outer surface of the end cap 20 does not play a role in the operation of the end cap with respect to the overall sign system. Rather, in the embodiment of FIGS. 1-9, the stepped sidewalls of cap 20 are provided to afford efficiencies in plastic molding, while accommodating the dual section interior bore of the end cap.

Figure 7:
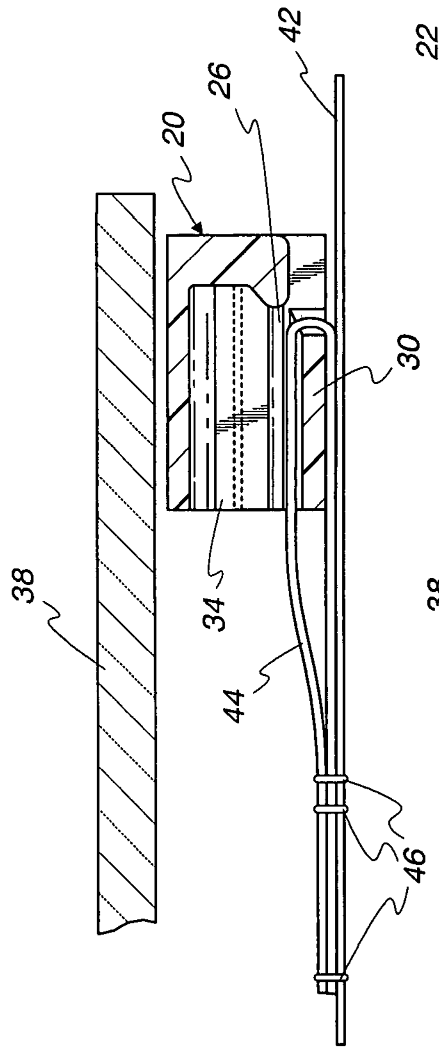
FIGS. 7-9 together comprise a sequence of cross-sectional views showing fitting of the end cap to a rib member.
Figure 8:
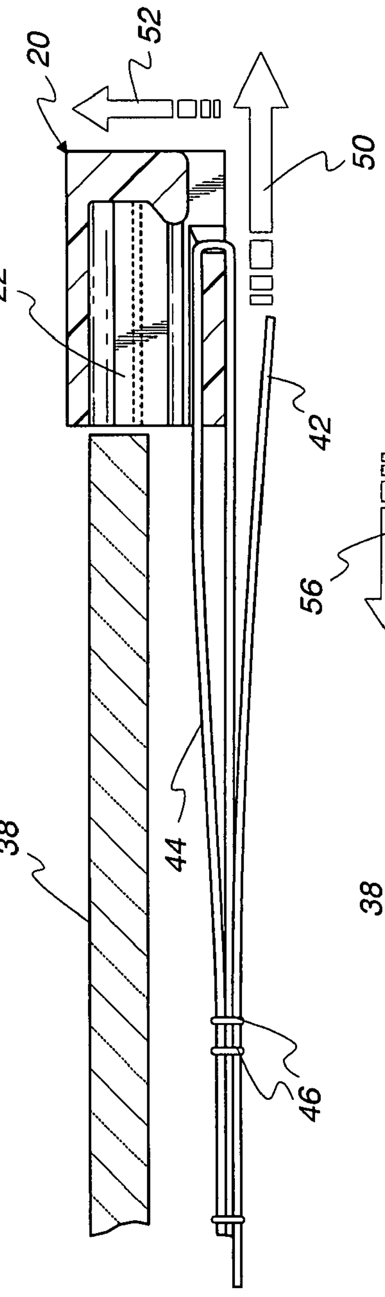
Figure 9:
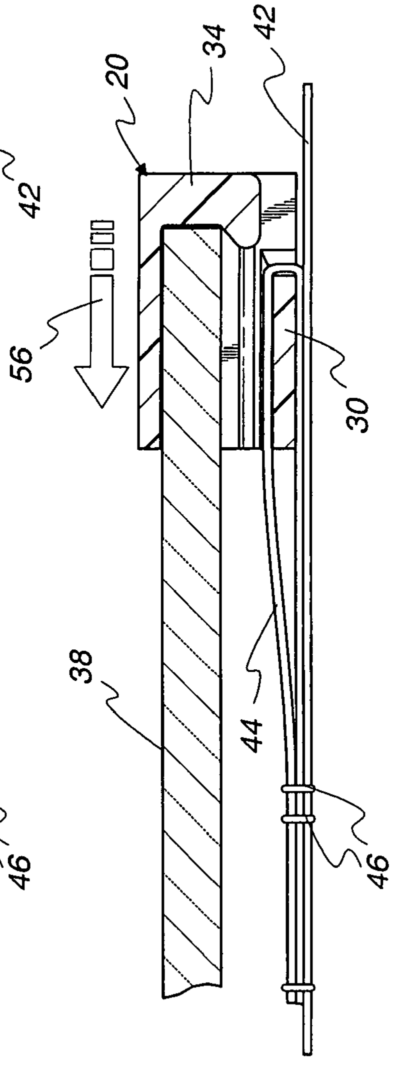

Referring now to FIGS. 7-9, end cap 20 is secured to a corner of a message panel 42 by an elastic, flexible tether 44 which is looped about bottom wall 30 and secured to the message panel 42 by stitching 46. In FIG. 7, end cap 20 and message panel 42 are shown in an initial position wherein a rib 38 of a panel support extends to the corner of the message panel. As can be seen in the initial position shown in FIG. 7, end cap 20 is at rest, with the flexible tether 44 unextended, and with the message panel 42 being stretched as far as possible so as to overlie the rib end. As indicated in FIG. 8, by pulling end cap 20 in the direction of arrow 50, tether 44 is elastically stretched so as to allow end cap 20 to pass beyond the free end of rib 38. The free end of the rib is thereafter aligned with upper opening 22 with an upward displacement of the end cap in the direction of arrow 52.

Once the rib and end cap are aligned as indicated in FIG. 8, tension on tether 44 is relaxed, allowing the end cap to pass over the free end of rib 38, with the rib entering the end cap upper opening 22. With sufficient relaxation of tether 44, so as to allow its stored bias force to move the end cap in the direction of arrow 56 (see FIG. 9), end cap 34 is allowed to abut the free end of rib 38, thus securing the message panel to the support rib 38. It is generally preferred that some stored elastic force be maintained in tether 44 after the end cap is fully engaged with rib 38. This provides a small bias force useful in overcoming any subsequent expansion of the sign panel, such as might occur later in the day, after exposure to the sun. This is a particularly useful feature since sign systems are typically erected early in the day and, after continued exposure to the sun, the sign panels become heated, thus giving rise to thermal expansion (i.e. stretching of the panel material with heat) not experienced during the early morning hours.

Referring now to FIGS. 10-16, a second embodiment of a sign system according to principles of the present invention includes an end cap 60 generally identical to end cap 20 but for the addition of outboard ribs 62 extending along the sides 64 of end cap 60. As can be seen for example in the upper portion of FIG. 11, end cap 60 is secured with the same tether 44 described above secured to message panel 42 with stitching 46 (see also FIG. 12). Other fastening techniques, such as those employing with fasteners could also be used, if desired.

Figure 25:
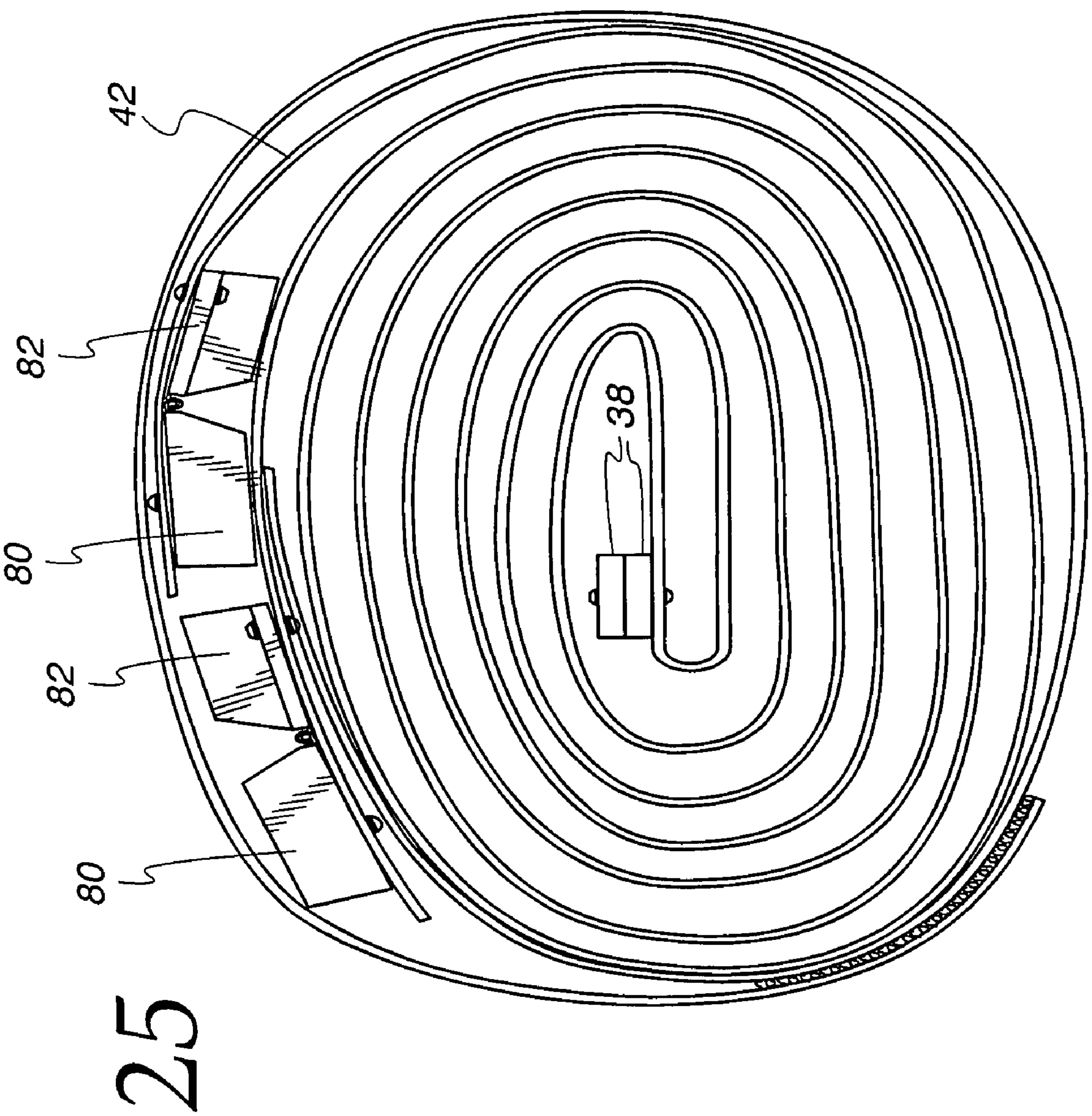
FIG. 25 shows storage of a sign system.

Included, in addition to end cap 60, is a mount generally indicated at 70. As can be seen for example in FIGS. 12 and 13, mount 70 is secured to message panel 42 by a backing plate and fasteners, such as rivet fasteners 74. If desired, mount 70 can be made as one rigid construction, but preferably is made in two parts 80, 82 which are hinged together at 84 so as to allow relative flexing of the two members 80, 82, to accommodate storage in a compact roll configuration, as indicated in FIG. 25. Accordingly, in the preferred embodiment, mount 70 comprises a hinged mount construction and most preferably a continuous or near-continuous or hinged channel construction.

Figure 10:
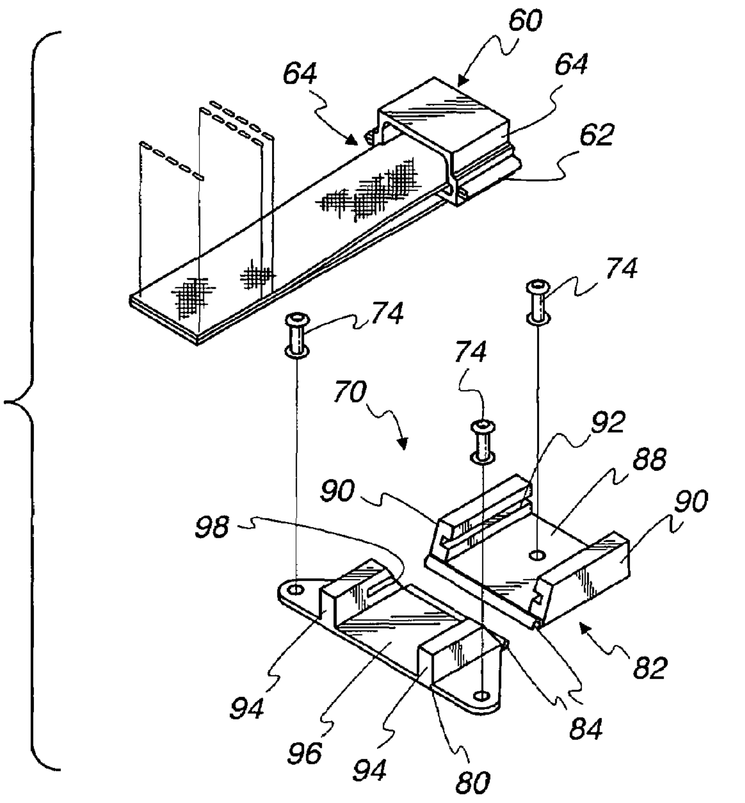
FIG. 10 is an exploded perspective view of the end cap, tether and hinged channel mounts.
Figure 11:
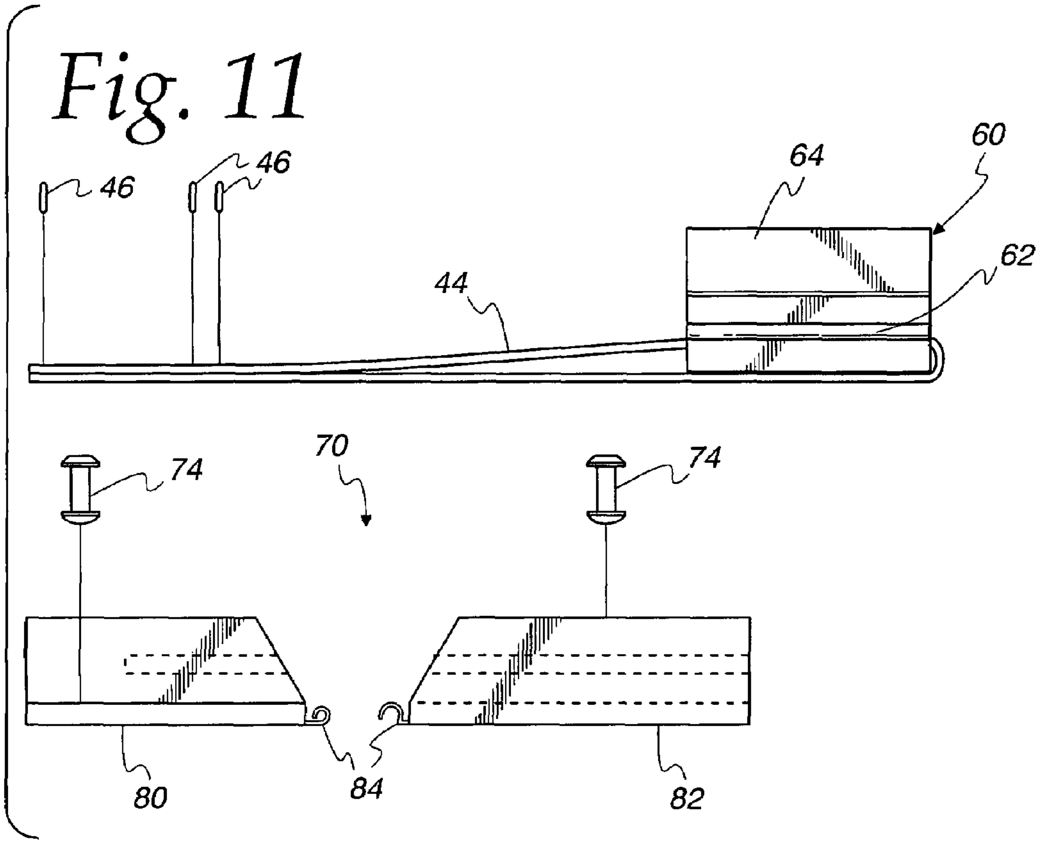
FIG. 11 is an exploded side elevational view of the arrangement of FIG. 10.
Figure 14:
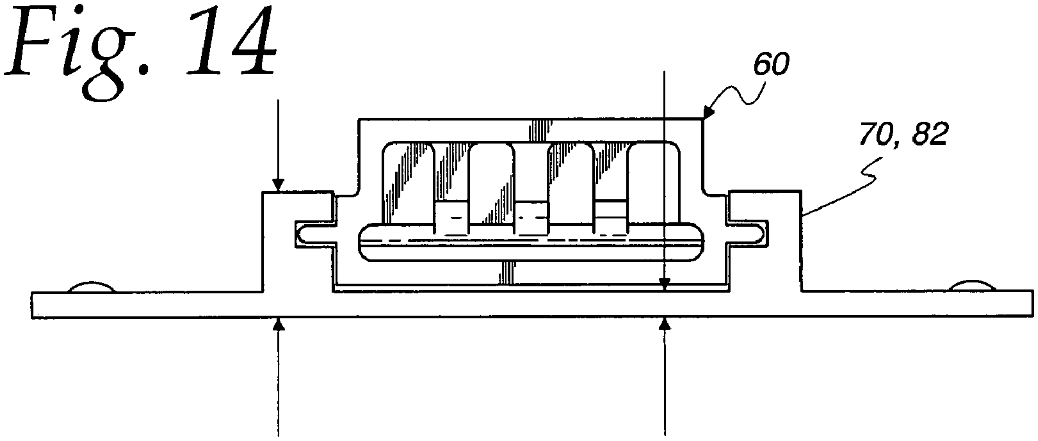
FIG. 14 is an end view of the fastener system, with the tether omitted.
Figure 15:
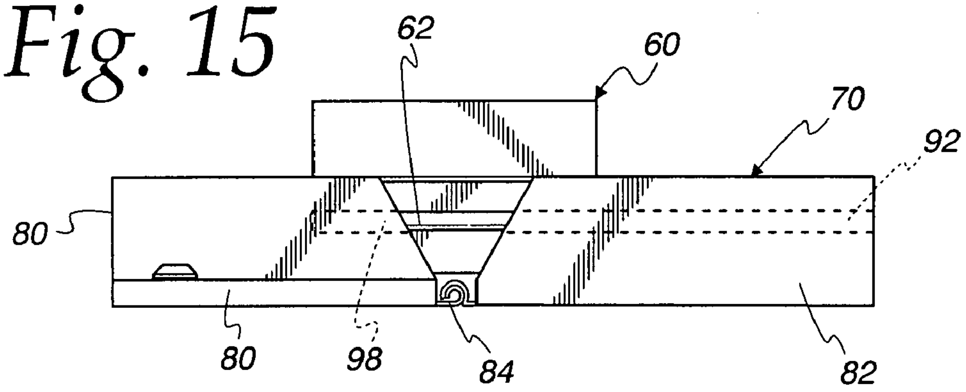
FIG. 15 is a side elevational view thereof.
Figure 16:
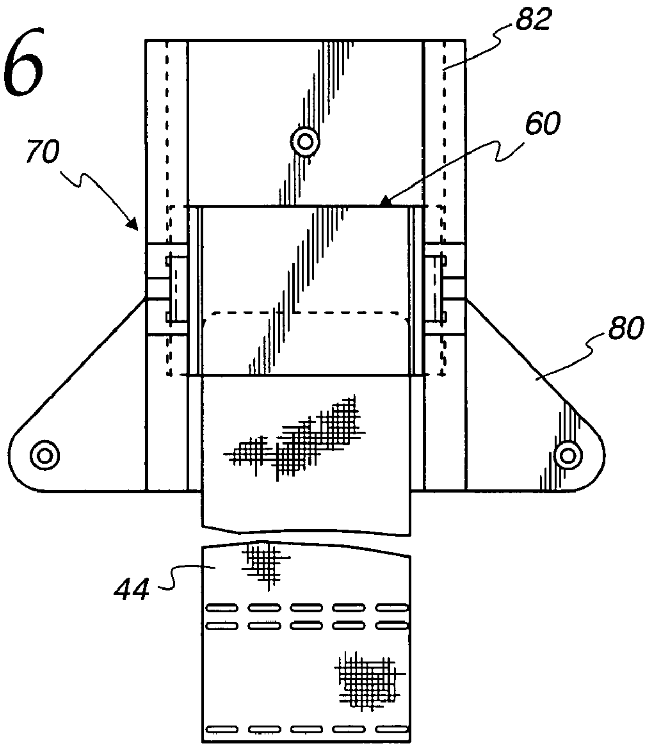
FIG. 16 is a top plan view thereof.
Figure 17:
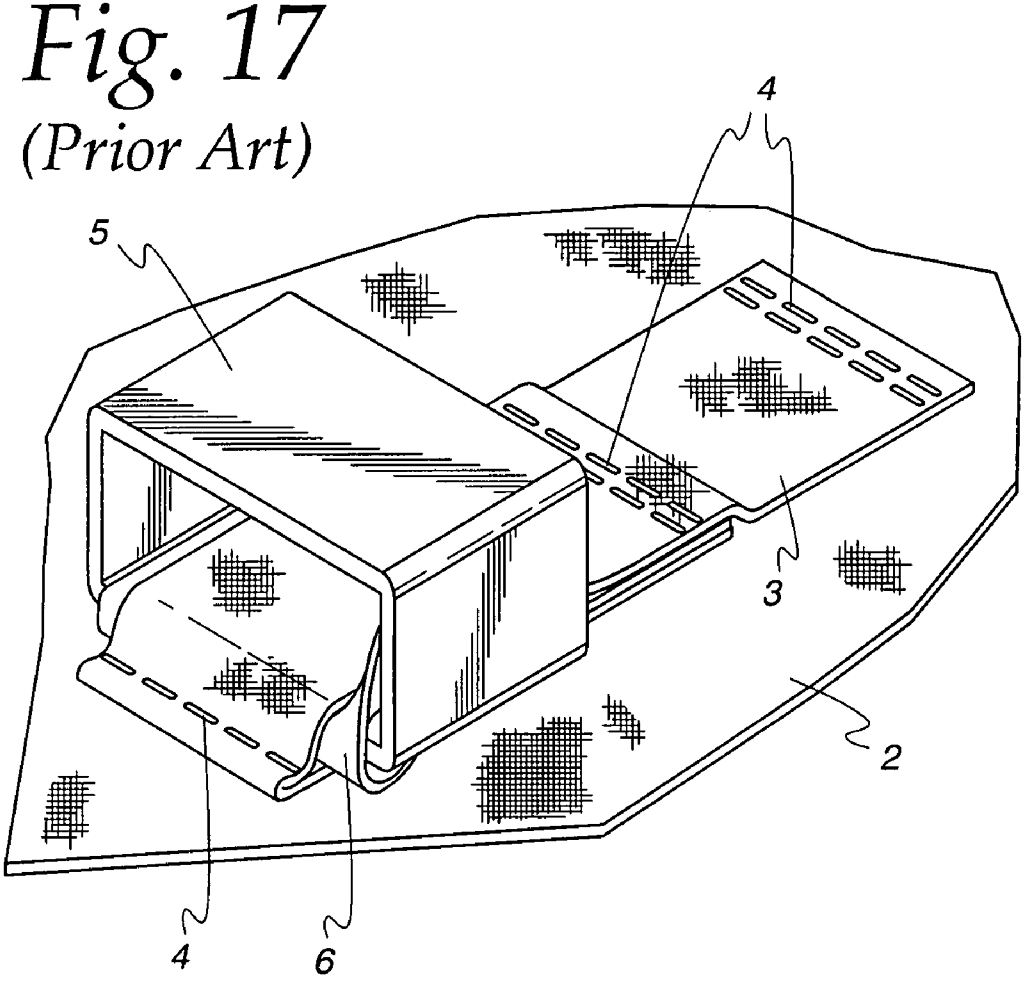
Fig. 17 (Prior Art)
FIG. 17 is a perspective view of a prior art fastener system.
Figure 18:
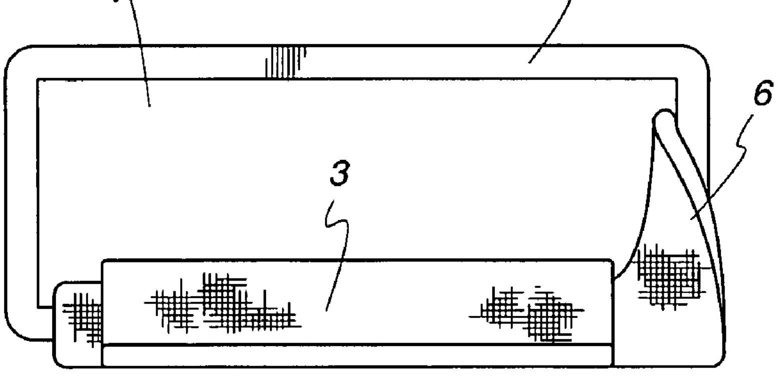
Fig. 18 (Prior Art)
FIG. 18 is a front elevational view thereof.
Figure 19:
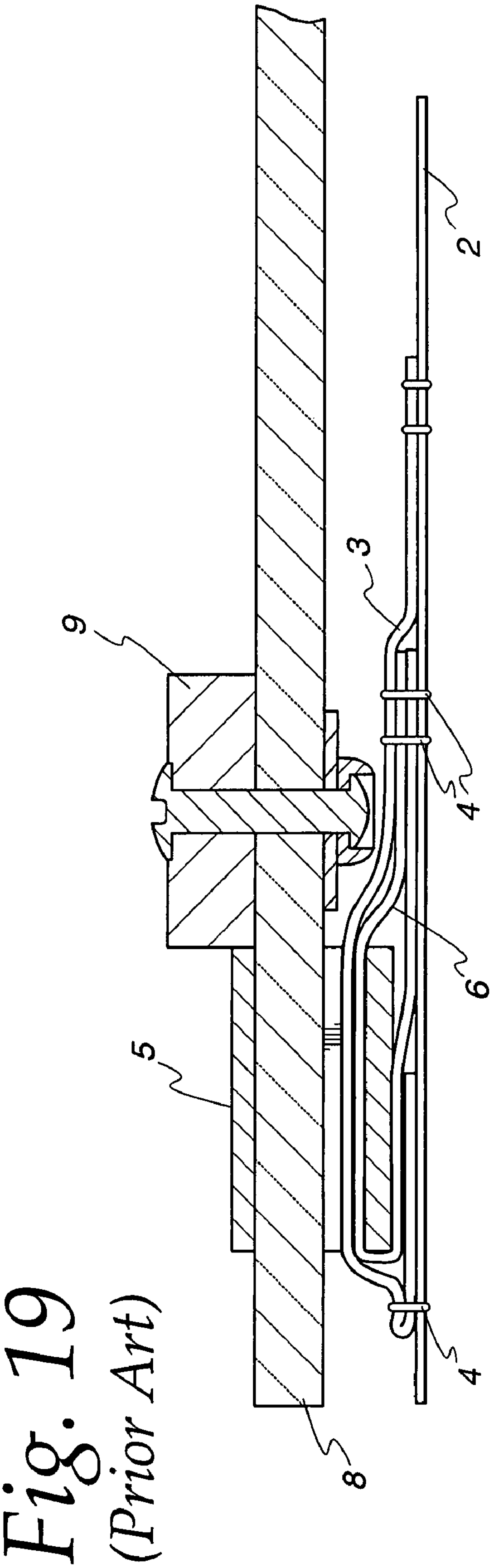
Fig. 19 (Prior Art)
FIG. 19 is a longitudinal cross-sectional view thereof, shown fitted to a rib member.

Referring now to FIG. 10, mount member 82 includes a bottom wall 88 with an aperture for receiving one of the fasteners 74. Side walls 90 include channels or slots 92 which slidingly receive ribs 62. If desired, the ribs 62 and slots 92 can be interchanged one for the other, or mixed in the same embodiment. Mount member 80 includes side walls 94 located on a base 96 which includes outboard ears for receiving fasteners 74. Side walls 94 also define partial channels 98 for receiving an end portion of ribs 62. As can be seen in FIG. 10, channel 98 does not extend along the entire length of side wall 94, but rather is terminated at a rib stop which prevents further travel of rib 62. Accordingly, as illustrated in FIG. 13, end cap 60 when fully fitted to mount 70, comes to rest at a defined position relative to mount 70, so as to span both hinged members of mount 70. This preferred stop arrangement is further illustrated in FIGS. 15 and 16.

Prior to the end cap being fully seated within the mount members 80, 82 of mount 70, the end cap is free to travel within mount member 82 and to some limited extent within the forward end portion of mount member 80. As indicated in FIGS. 12-13, mount 70 is secured to a corner of message panel 42, as is the in board end of tether 44. In field operations, end cap 60 is pulled to stretch tether 44, allowing the end cap to be fitted over a free end of supporting rib. However, with this embodiment, as the end cap is fitted over the free end of the supporting rib, it is also simultaneously fitted within mount member 80 with the ribs 62 being received in channels 92. As tension on the end cap is relaxed, the stored bias force within tether 44 retracts the end cap toward the center of the sign panel, causing the end cap to slide along the free end of the support rib, with ribs slidingly inserted along the channels of mount member 82. With continued relaxing of the stored force within tether 44, ribs 62 of end cap 60 enter mount member 80 until they become fully seated in the position illustrated in FIGS. 15 and 16. As can be seen, with the end cap fully seated in mount 70, end cap 60 spans the hinge line between the mounting members, thus preventing relative flexing or angular bending of one mount member with respect to the other. Accordingly, the mount member and the corner of the message panel to which it is affixed, are held in a flat planar configuration.

Figure 20:
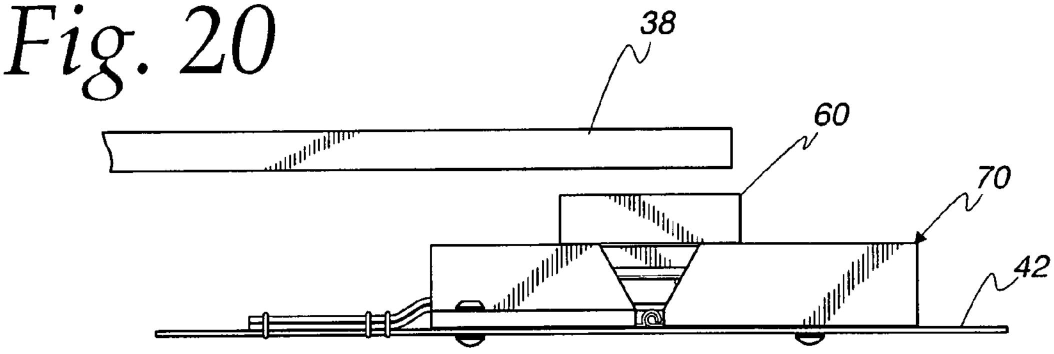
FIGS. 20-22 together comprise a sequence of views showing fitting of the fastener system of FIG. 13 to a support rib.
Figure 21:
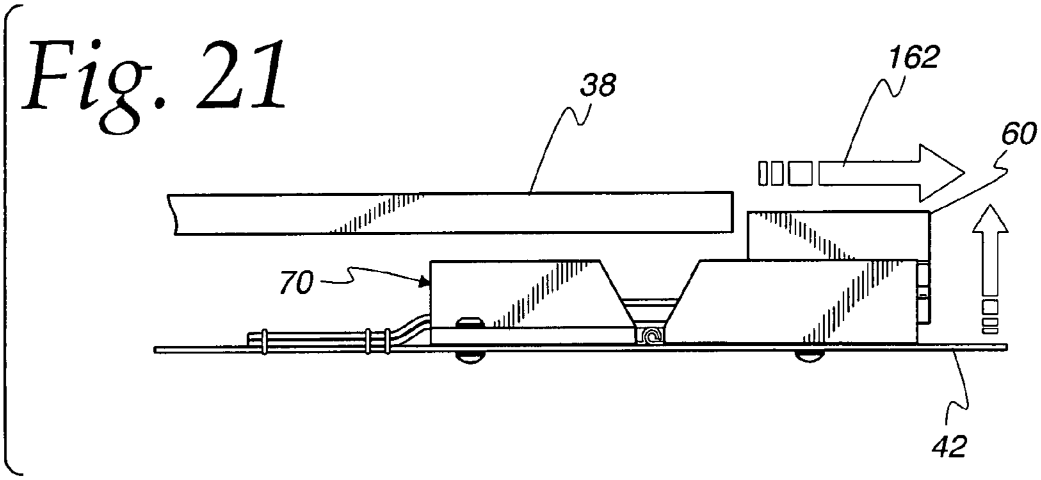
Figure 22:
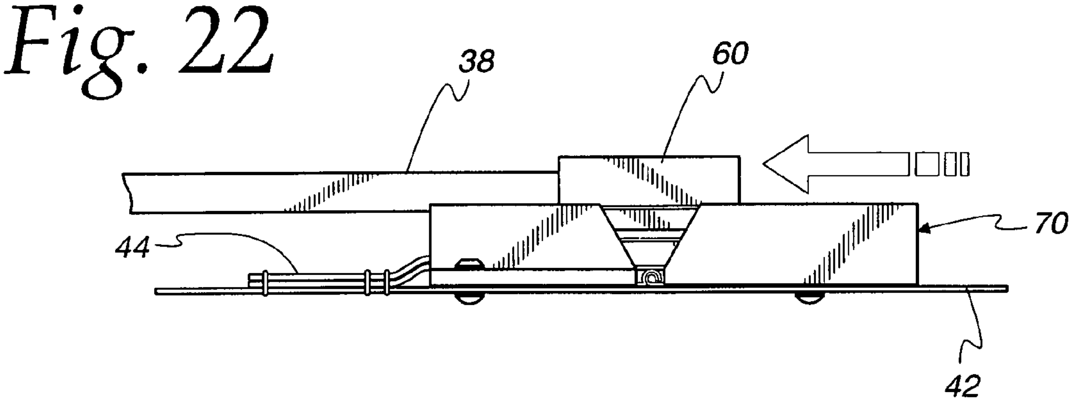

The assembly sequence is illustrated in FIGS. 20-22. It is generally desired that end cap 60 be held captive by mount 70 at all times including that portion of the assembly illustrated in FIG. 21 when the tether is fully extended so as to allow end cap 60 to clear the free end of rib 38. If desired, a stop can be added to end cap 60 or mount 70 or both, to keep the end cap 60 captive on the mount 70. In FIG. 20, end cap 60 is in its rest position relative to mount 70. It is generally preferred that some tension remain in the tether so as to bias the end cap, maintaining it in the rest position. FIG. 20 assumes that the corner of the message panel is stretched as far as possible so as to overlie the free end of the support rib 38. In FIG. 21, as mentioned, tension is applied to end cap 60 in the direction of arrow 102 so as to allow the end cap to clear the free end of the support rib. In FIG. 22 the tension on the end cap is relaxed, so as to allow the end cap to receive the free end of rib 38, while becoming fully seated in mount 70.

Figure 23:
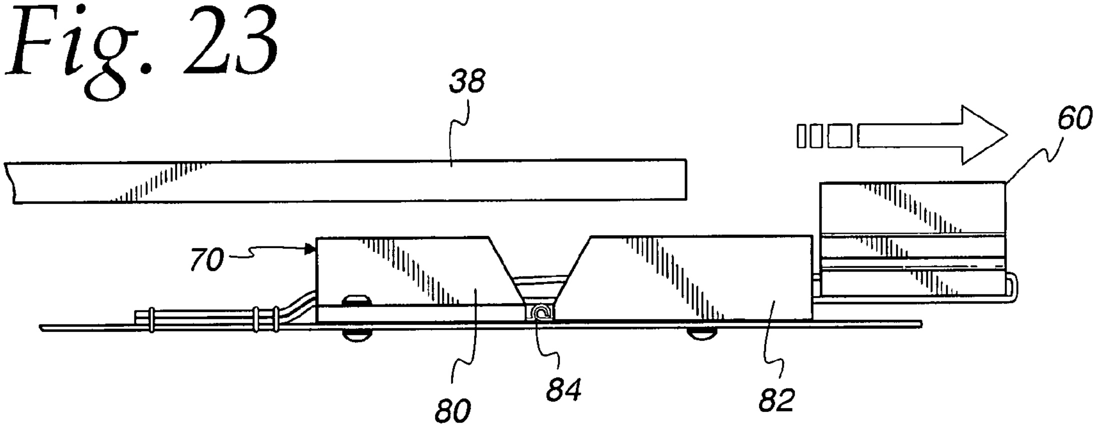
FIGS. 23 and 24 show disassembly of the fastener system from a rib member, in preparation of storage.
Figure 24:
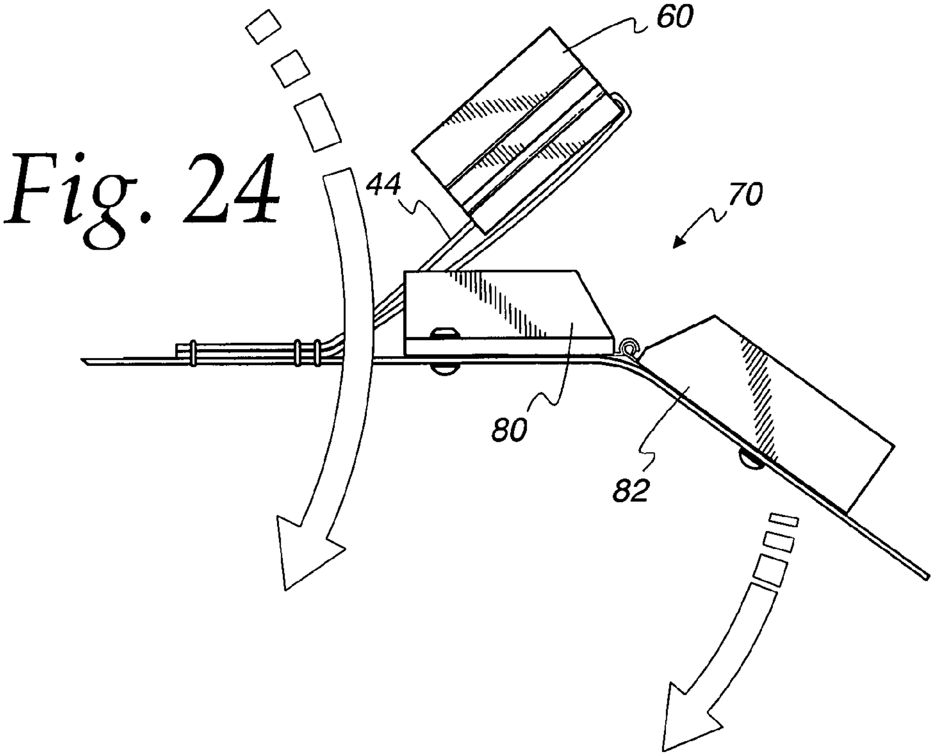

Referring now to FIGS. 23-25, disassembly is initiated by applying tension to end cap 60 to allow the end cap to travel beyond the free end of support rib 38, thus disengaging the panel mount system from the support rib. As mentioned, it may be desirable to maintain engagement between end cap 60 and mount 70 at all times. However, when the message panel is required to be bold in a relatively tight winding, such as that illustrated in FIG. 25, it has been found convenient to allow mount 70 to bend about its hinge line, allowing the mount to conform to a relatively small diameter circumference. Accordingly, sufficient travel is allowed so as to clear outboard member 82 of mount 70, in the manner illustrated in FIG. 23. Once clear of mount 70, end cap 60 is allowed to retract in the manner indicated in FIG. 24, thereby relieving tension in tether 44. This allows the mount members 80, 82 to pivot in the clockwise direction indicated in FIG. 24 to allow the mount sections 80, 82 to conform to the outer radius of the rolled message panel 42, the preferred storage configuration for the signed system as shown in FIG. 25.

As can be seen for example in FIG. 10, mount members 80, 82 have corresponding hinge members 84 which extend substantially the entire width of the mount members. Further, as can be seen for example in FIG. 23, the side walls of the mount members are terminated with beveled ends adjacent hinge 84 to allow the mount members to bend in an opposite direction, that is opposite to the direction illustrated in FIG. 24. This opposite bending is required for the inverted, right-hand pair of mount members 80, 82 illustrated in FIG. 25. Virtually any hinge arrangement can be employed, as may be desired. For example, the hinge members 84 can comprise a full barrel hinge with a hinge pin being provided to secure mating of the barrel portions together. If desired, the hinge members can have open cross-sections comprising a portion of a circle, which interlock when the hinge members are sharply bent to form a small acute angle and which engage one another to interlock as the angle is opened, as is typical during normal operation of storage and deployment of the sign system.

Figure 26:
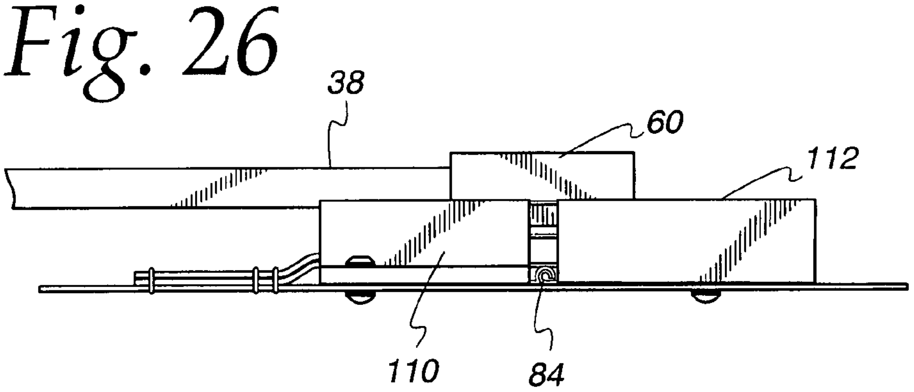
FIG. 26 shows an alternative hinge channel mount.

Referring to FIG. 26, an alternative arrangement is employed where mount members 110, 112 have opposed square ends separated by a gap spanning hinge 84. The amount of the gap defines the amount of reverse bending that is possible with the hinge members engaged one with the other.

Figure 27:
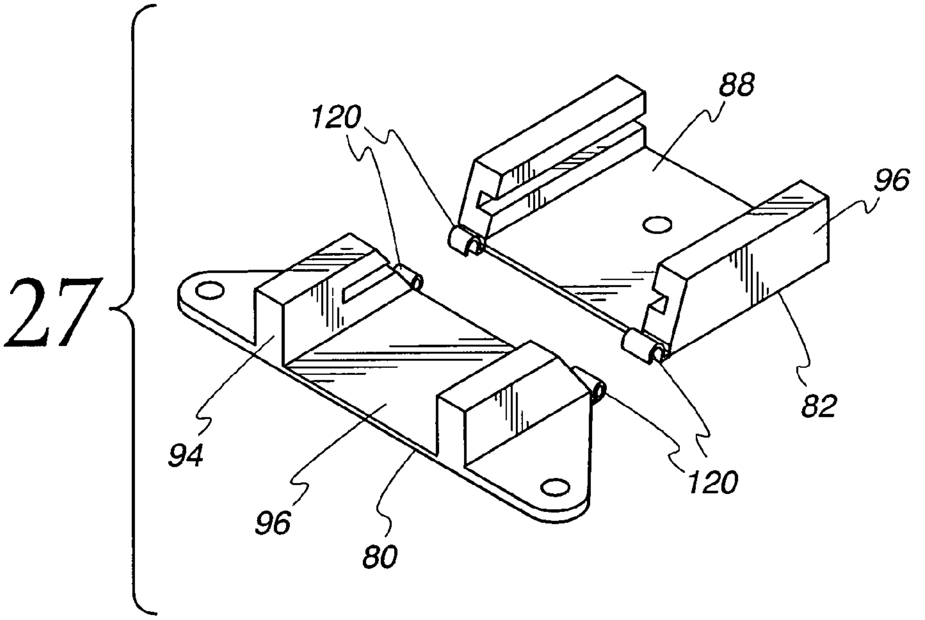
FIG. 27 is an exploded perspective view of an alternative hinge channel mount arrangement.
Figure 28:
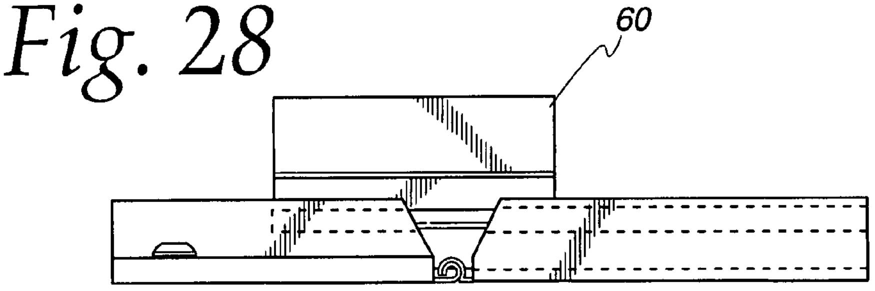
FIG. 28 is a side elevational view thereof with the end cap installed.
Figure 29:
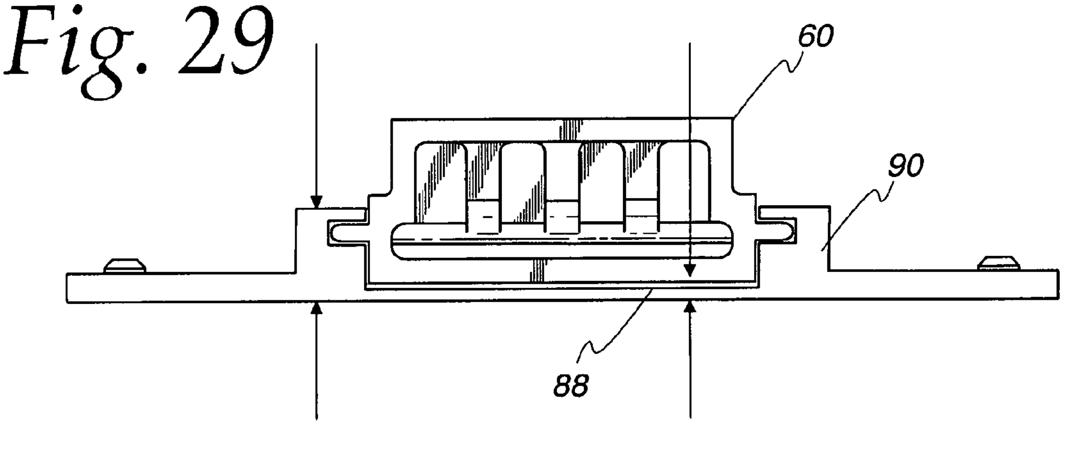
FIG. 29 is an end view thereof.

Turning now to FIGS. 27-29 an alternative panel mount system is shown with panel mount members 80, 82 joined together by discontinuous interengaging hinge members 120 located on either side of the mount members 80, 82 (see FIG. 27). In this manner, end cap 60 can be lowered relative to the mount members since it no longer is required to clear or extend above the hinge members. As indicated in FIGS. 28 and 29, the bottom of end cap 60 can be positioned at very close to the bottom walls 96, 88 of mount members 80, 82. Accordingly, as indicated in FIG. 29 the gap for clearance between the bottom of end cap 60 and bottom wall 88 can be reduced, along with a reduction in the height of side walls 90, 94.

Figure 30:
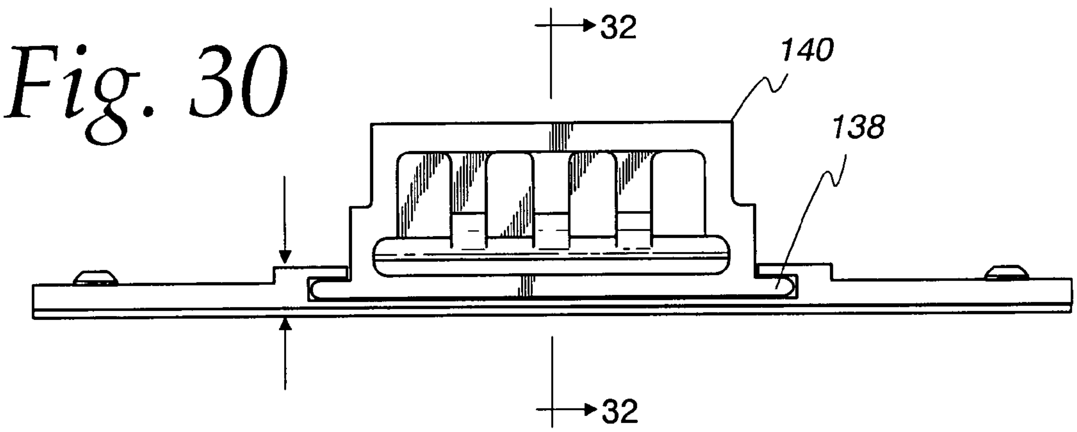
FIG. 30 is an end view of an alternative fastener system.
Figure 31:
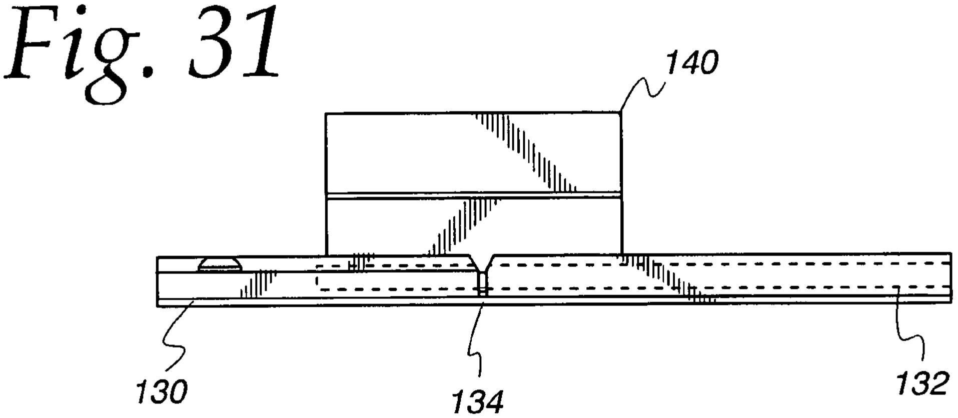
FIG. 31 is a side elevational view thereof.
Figure 32:
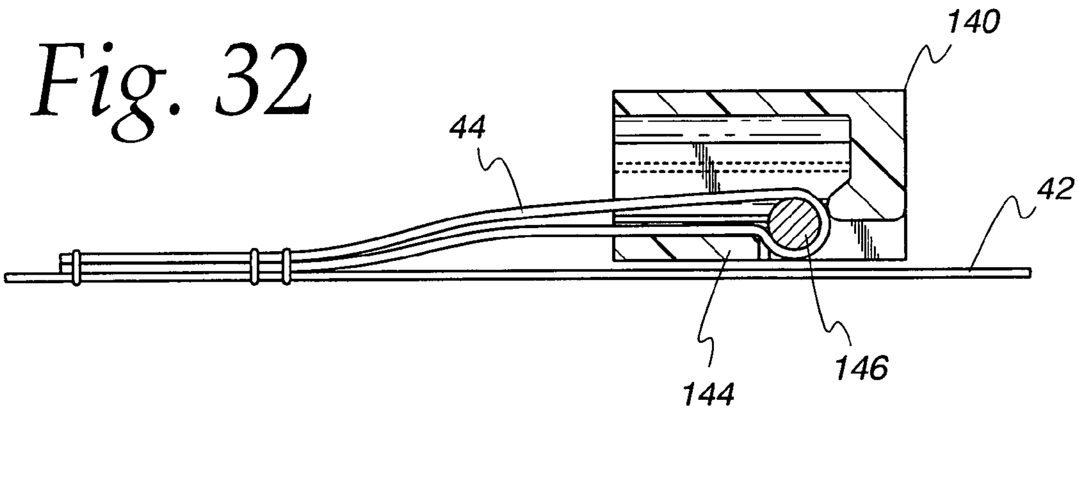
FIG. 32 is a cross-sectional view taken along the line 32-32 of FIG. 30, shown in combination with a tether and sign panel.

Referring now to FIGS. 30-32, an alternative sign mount system is illustrated with mount members 130, 132 being carried by a common flexible base 134 (see FIG. 31). Preferably, members 130, 132 have a molded plastic construction which is secured to base 134 by suitable means, such as thermal welding or adhesives. Base 134 can simply comprise a strip of flexible plastic material. As can be seen in FIGS. 30-32, the side profile of the mount is substantially reduced and no separate, articulated hinge components are required. As a further refinement, the rib 138 can be lowered in line with the bottom of the end cap 140, with ribs 138 coterminous with the bottom wall of end cap 140. The ribs of the end cap are more easily aligned with slots in the outboard mount member, during initial engagement of the two components. If desired, the outboard mount member 82 can be provided with an "front porch" portion against which the bottom of the end cap is placed to provide convenient alignment of the interengaging ribs and channels. As can be seen for example in FIG. 32, it is generally preferred that tether 44 be secured above a bottom wall 144 of end cap 140 to further enhance the low profile of the panel mounting system. Any conventional securement can be provided for attaching tether 44 to end cap 140. For example, a free end of tether 44 can be embedded within the end cap as the end cap is molded. As indicated in FIG. 32, a roll pin or cross member 146 is provided to mechanically secure the tether to the interior of the end cap. Pin 146 can extend between opposed side walls of the end cap, being inserted through aligned spaced apertures formed therein.

These and other advantages, variations and optional features are made possible with the present invention. It will be understood that the foregoing relates only to preferred embodiments of the invention, and that numerous changes and modifications may be made therein without departing from the spirit and scope of the invention as defined in the following claims. For example, end cap 20 is shown in FIG. 2 as completely surrounding the cross-section of a rib received in cavity 34. If desired, the end cap can be constructed with a longitudinal gap in the top wall or bottom floor, for example, so that the rib cross-section is only partly surrounded by the end cap. Also, the tether is shown looped around the floor of the end cap. If desired, only a free end of the tether can be joined to the end cap during the molding process, or later, using a rivet fastener, for example.

What is claimed is:

1. A flexible message panel system supported for display by a supporting rib, comprising:

a flexible message panel;

an end cap having rail members and defining a first passageway for receiving an end of the supporting rib;

a flexible, resiliently extendable tether having a free end secured to the end cap and an opposed, second end secured to the flexible message panel;

a hinge having first and second hinge parts joined end-to-end and each having an attachment for securement to the flexible message panel;

the first and the second hinge parts having rail components that are engageable with the end cap rail members and that together form a substantially continuous rail path for confining the end cap to sliding movement along the rail path; and the end cap and the tether cooperating to define a first bridging position with the end cap bridging the first and the second hinge parts to prevent substantial hinged movement between the first and the second hinge parts and a second non-bridging position allowing substantial hinged movement between the first and the second hinge pans.

2. The system of claim 1 wherein the end cap defines a second passageway for receiving the one end of the tether, the first and the second passageways separated from one another by a separator.

3. The system of claim 1 wherein the separator comprises a stepped sidewall confining the one end of the tether to the second passageway.

4. The system of claim 1 wherein the end cap further includes a floor partly defining the second passageway, with the one end of the tether being secured to the floor.

5. The system of claim 4 wherein the end cap further includes a stop wall at least partly enclosing one end of the first passageway so as to contact the end of the supporting rib.

6. The flexible message panel system according to claim 1 wherein the slidable interengagement comprises a sliding rib carried on the end cap and a recess defined by the first and the second hinge parts for slidably receiving the sliding rib.

7. The flexible message panel system according to claim 1 wherein the hinge parts are joined together with an articulated hinge.

8. The flexible message panel system according to claim 1 wherein the hinge parts are joined together with a living hinge.

* * * * *

UNITED STATES PATENT AND TRADEMARK OFFICE

CERTIFICATE OF CORRECTION

PATENT NO. : 7,637,046 B2
APPLICATION NO. : 11/710385
DATED : December 29, 2009
INVENTOR(S) : Grant D. Dicke and Jeffrey A. Williams It is certified that error appears in the above-identified patent and that said Letters Patent is hereby corrected as shown below:

Column 3, line 56, “provided for the slidably” should be “provided for slidably”
Column 4, line 62, “other then” should be “other than”

In the Claims:

Claim #1, Column 9, line 7, “second hinge pans” should be “second hinge parts”

Signed and Sealed this
Fifth Day of April, 2011

David J. Kappos
*Director of the United States Patent and Trademark Office*